(12) United States Patent
Delarue et al.

(10) Patent No.: US 12,540,589 B2
(45) Date of Patent: Feb. 3, 2026

(54) ASSEMBLY COMPRISING A NACELLE PANEL AND A MEMBER FORMING A BALL

(71) Applicant: Safran Nacelles, Gonfreville-l'Orcher (FR)

(72) Inventors: Jean-Baptiste Delarue, Moissy-Cramayel (FR); Bertrand Léon Marie Desjoyeaux, Moissy-Cramayel (FR); Moncef M'Hasni, Moissy-Cramayel (FR)

(73) Assignee: Safran Nacelles, Gonfreville-l'Orcher (FR)

( * ) Notice: Subject to any disclaimer, the term of this patent is extended or adjusted under 35 U.S.C. 154(b) by 11 days.

(21) Appl. No.: 18/350,885

(22) Filed: Jul. 12, 2023

(65) Prior Publication Data

US 2024/0125283 A1 Apr. 18, 2024

(30) Foreign Application Priority Data

Jul. 13, 2022 (FR) ...................................... 2207256

(51) Int. Cl.
*F02K 1/32* (2006.01)
*B64D 29/06* (2006.01)

(52) U.S. Cl.
CPC ................ *F02K 1/32* (2013.01); *B64D 29/06* (2013.01); *F05D 2230/60* (2013.01)

(58) Field of Classification Search
CPC ....... E05B 77/38; E05B 79/12; B64C 1/1407; B64C 1/1461; F16F 7/116
See application file for complete search history.

(56) References Cited

U.S. PATENT DOCUMENTS

| 3,153,321 | A | * | 10/1964 | Spears, Jr. | ................ | F02K 1/58 |
| | | | | | | 239/443 |
| 4,533,098 | A | | 8/1985 | Bonini et al. | | |
| 5,927,647 | A | * | 7/1999 | Masters | .................... | F02K 1/72 |
| | | | | | | 244/110 B |
| 8,201,390 | B2 | * | 6/2012 | Sternberger | .............. | F02K 1/72 |
| | | | | | | 239/265.33 |
| 9,212,689 | B2 | * | 12/2015 | Vauchel | .................... | F02K 1/72 |
| 9,623,976 | B2 | * | 4/2017 | James | .................... | B64D 33/04 |
| 10,370,111 | B2 | * | 8/2019 | Sawyers-Abbott | .... | B64D 29/06 |
| 10,480,453 | B2 | * | 11/2019 | Sawyers-Abbott | ..... | F02K 1/763 |
| 2013/0062434 | A1 | * | 3/2013 | Vauchel | ................ | B64D 33/04 |
| | | | | | | 74/592 |
| 2018/0056554 | A1 | * | 3/2018 | Gaw | ....................... | B29C 43/50 |

(Continued)

FOREIGN PATENT DOCUMENTS

EP 2 560 877 B1 4/2016

OTHER PUBLICATIONS

French Search Report of FR 2207256 dated Feb. 24, 2023.

*Primary Examiner* — Joshua J Michener
*Assistant Examiner* — Cindi M Curry
(74) *Attorney, Agent, or Firm* — Sughrue Mion, PLLC

(57) ABSTRACT

An assembly including a nacelle panel of an aircraft engine, the nacelle panel including an outer skin, an inner skin and a central layer interposed between the outer skin and the inner skin, and the nacelle panel having a free inner enclosure contiguous with the outer skin, and a member forming a link including one or more degrees of freedom, the member being attached to the nacelle panel solely by one or both of the outer skin and the inner skin, and the member extending facing the free inner enclosure.

24 Claims, 5 Drawing Sheets

(56) References Cited

U.S. PATENT DOCUMENTS

| | | |
|---|---|---|
| 2018/0066607 A1 | 3/2018 | Sawyers-Abbott et al. |
| 2018/0080409 A1* | 3/2018 | Moradell-Casellas ........................ B64D 33/04 |
| 2019/0170088 A1* | 6/2019 | Gonidec ................... F02K 1/12 |
| 2021/0308967 A1* | 10/2021 | Thai ..................... B29C 33/405 |

* cited by examiner

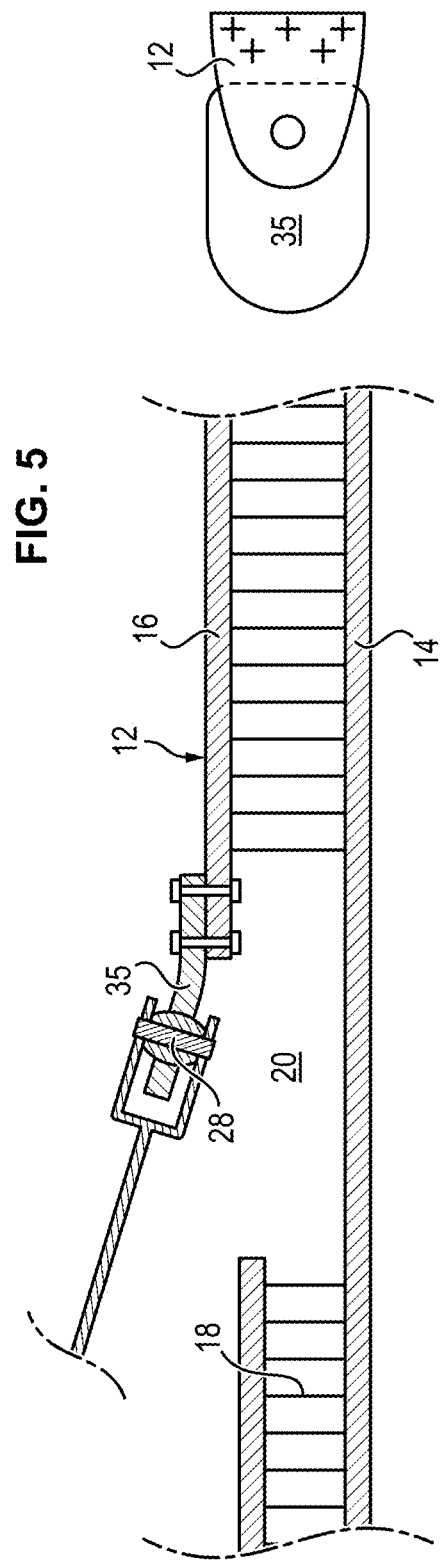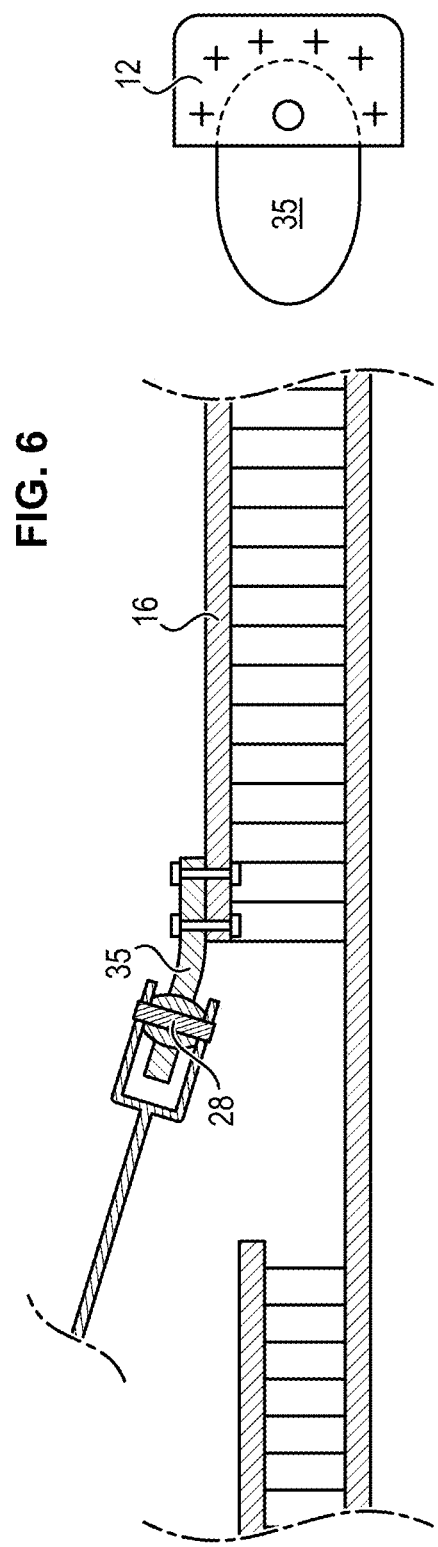

ASSEMBLY COMPRISING A NACELLE PANEL AND A MEMBER FORMING A BALL

FIELD OF THE INVENTION

The invention relates to the thrust reversers of aircraft engines.

PRIOR ART

The thrust reversers of airplane engines are used to brake the airplane during landing once it is on the ground.

The thrust reversers with fixed grids equipping certain engines include a translating cowl (or transcowl) mounted movably and driven by actuators for its deployment and closing. Each actuator is housed between an outer panel and an acoustic inner panel of the nacelle. A metallic fitting connects the fixed end of the actuator to the inner panel, a panel which is embodied in the form of a sandwich structure comprising two skins on either side of a central honeycomb layer. The fitting is attached to the sandwich panel via attachments passing through the two skins and the central layer. To do this it is necessary to reinforce the concerned area of the panel with a densified honeycomb (often made of $1/8^{th}$ aluminum at 354 kg/m$^3$), to avoid the collapse of the honeycomb under the setting force of the attachments.

However, there is a trend toward the use of engines with a high expansion ratio and a wide diameter leading to lower fan rotation speeds. It leads to a need for lower vibration frequencies to be attenuated, and therefore an increase in the thickness of the acoustic treatments, and thus of the panels. This makes it harder to embody through attachments within the desired lengths and diameters. There is also a general trend toward bringing the inner and outer aerodynamic lines closer together, which limits the space available for the fitting. Specifically, little space is then available between the inner panel and the outer panel of the thrust reverser.

In this context, one possibility is to make a local reduction in thickness in the inner panel to house the attachment fitting of the actuator inside it. But this solution complicates the lay-up of the pre-impregnated material for the production of the sandwich panel and degrades its mechanical behavior.

An aim of the invention is to ensure the attachment of the actuator despite these limitations.

SUMMARY OF THE INVENTION

For this purpose, provision is made according to the invention for an assembly comprising:
- a nacelle panel of an aircraft engine,
- the panel comprising an outer skin, an inner skin and a central layer interposed between the outer and inner skins, the panel having a free inner enclosure contiguous with the outer skin; and
- a member forming a link comprising at least one degree of freedom,
- the member being attached to the panel solely by at least one of the outer and inner skins,
- the member extending facing the enclosure.

Thus, the attachment of the member and the free enclosure make it possible to reduce the volume required for the placing of the member linked to the panel. This is because the enclosure forms a volume for this member and its travel. It is therefore a system for connecting an actuator rod directly inside the panel, requiring a minimum of space between the inner panel and the outer panel of the thrust reverser. This solution responds to the limits on space of known solutions.

Provision can be made for the panel to comprise a box delimiting the enclosure.

This box makes it easy to produce the enclosure.

Provision can be made for at least one of the skins to comprise a reinforcement contiguous with the member and having a surface area smaller than a surface area of the outer skin.

The reinforcement facilitates the embodiment of the link with the ball by providing a local additional thickness for its installation. In addition, it fulfils a structural function since its thickness better distributes the stresses introduced by the actuator. This avoids the appearance of a local overstress peak.

Provision can be made for the reinforcement to be made of metal or of composite material.

For example, in the latter case, the reinforcement comprises several plies or layers of material with a gradually decreasing surface area between the different plies.

Provision can be made for the member to be attached to the panel solely by the outer skin or else for the member to be attached to the panel by the outer and inner skins.

Provision can be made for the member to comprise a support linking the member to one of the outer and inner skins.

Provision can be made for the member to comprise a fork and a pivot.

Provision can be made for the assembly to comprise an operating actuator attached to the member, for example an operating actuator of a thrust reverser.

Provision can be made for the outer skin to have an opening which opens into the enclosure and extends entirely at a distance from the member.

This opening facilitates the travel of the actuator.

Provision can be made for the central layer to be made of honeycomb.

Provision can be made for the link to be a ball joint.

Provision is also made according to the invention for an aircraft engine comprising a thrust reverser and an assembly according to the invention.

Provision is also made according to the invention for a method for manufacturing an assembly for a nacelle of an aircraft engine, comprising the following steps:
- producing a panel comprising an outer skin, an inner skin and a central layer interposed between the outer and inner skins, the panel having an inner enclosure contiguous with the outer skin; and
- attaching a member to the panel solely by at least one of the outer and inner skins, the member forming a link comprising at least one degree of freedom and extending facing the enclosure.

Provision can be made for the method to comprise at least one of the following features:
- a step of installing in the central layer a box configured to form the enclosure;
- the production of the box by additive manufacturing; and
- the production in the outer skin of an opening which opens into the enclosure and which is configured such that the opening extends entirely at a distance from the member.

Provision can be made for the method to comprise:
- during the production of the panel, the placing of layers of a composite material around a core,
- the baking of the panel, and
- the removal of the core from the panel after the baking.

The core thus makes it possible to produce the inner enclosure.

Provision can be made for the core to be made of foam, resin or thermoplastic material.

Provision can be made for the core to be covered with a mold release agent.

Provision can be made for the method to comprise at least one of the following features:
- the placing of main composite material layers configured to form at least one of the outer and inner skins, and reinforcing composite material layers having a surface area which is reduced in relation to a surface area of the main composite material layers and configured to be contiguous with the member;
- after the baking, a reinforcement is attached to the panel, particularly by a mechanical means or by bonding; and
- the panel is an acoustic inner panel.

DESCRIPTION OF THE FIGURES

Embodiments of the invention will now be presented by way of non-limiting example with reference to the drawings wherein:

FIGS. 5 to 11 are section views showing other embodiments of the assembly according to the invention.

FIG. 1 illustrates an aircraft engine 2 according to the invention forming in this case an airplane turbojet engine. Here this is a twin spool bypass turbomachine. The turbomachine comprises a rotor 4 and a stator 6 and has a main axis X-X which serves as axis of rotation of the rotor with respect to the stator.

Figure 1:
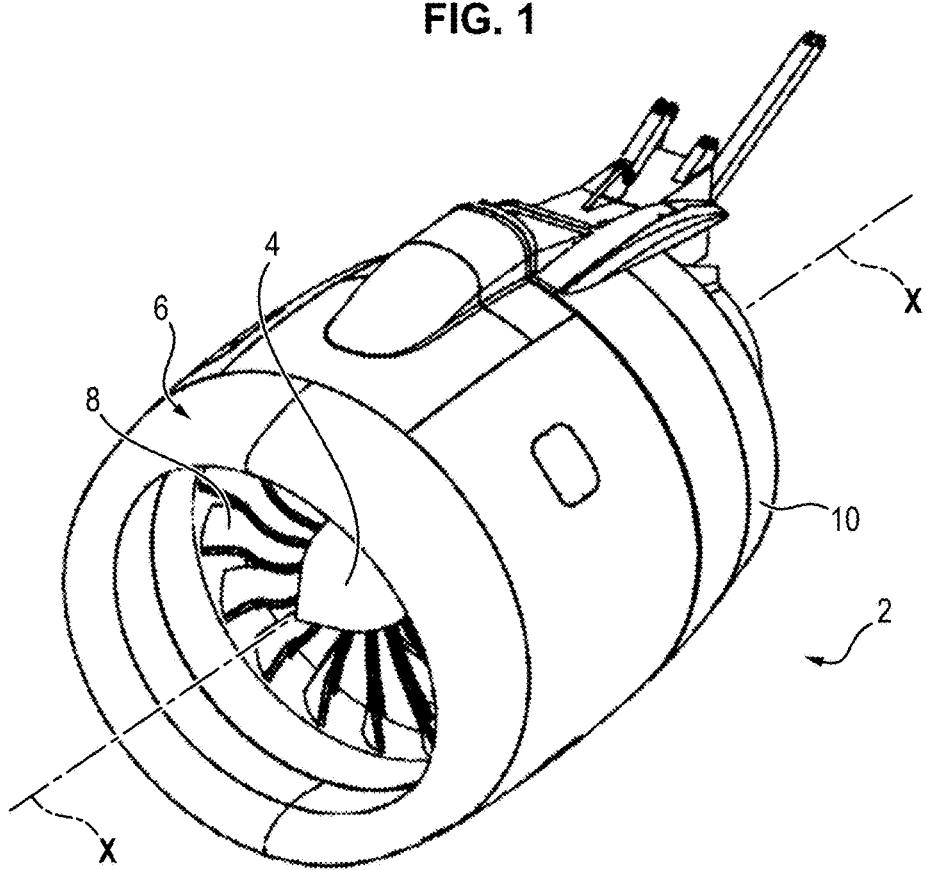
FIG. 1 is a perspective view of an aircraft engine according to a first embodiment of the invention.

The engine 2 particularly comprises a fan 8, one or more compressors, a combustion chamber and one or more (non-illustrated) turbines. These elements, with the exception of the fan 8, belong to a central part of the engine. Their parts movable in rotation about the axis X-X form the rotor. They define a main air flow path.

A nacelle 10 surrounds the fan 8 in such a way as to form a fan compartment and to define a secondary air flow path. The nacelle comprises a reverser particularly including one or more translating cowls mounted movably with respect to the stator 6 and making it possible to reverse a thrust supplied by the motor after the landing during the taxiing to slow down the airplane.

The attachment to the stator of an actuator used to actuate one of the translating cowls will now be addressed.

The engine 2 is equipped with an assembly according to the invention comprising a nacelle panel 12 rigidly attached to the stator. The panel 12 is an acoustic inner panel, and has a sandwich structure known per se and formed by an inner skin 14, an outer skin 16 and a central layer 18, for example made of honeycomb, interposed between the outer and inner skins. The two skins are locally parallel to one another and cover opposite faces of the honeycomb layer. These three layers form a rigid stack. The skins 14 and 16 are made of composite material and comprise fibers sunk into a synthetic material matrix. The outer skin 16 is further from the axis X-X than the inner skin 14.

The panel 12 has an inner enclosure 20 contiguous with the outer skin 16. This enclosure is free, in other words entirely filled with air, i.e. free of any material. In this case, the panel comprises a box 22 defining the enclosure 20. The enclosure 20 is contiguous with the outer skin 16. In this case it has a generally parallelepipedal shape. It has two main faces, upper 24 and lower 26, respectively contiguous with the outer 16 and inner 14 skins in this example.

Figure 3:
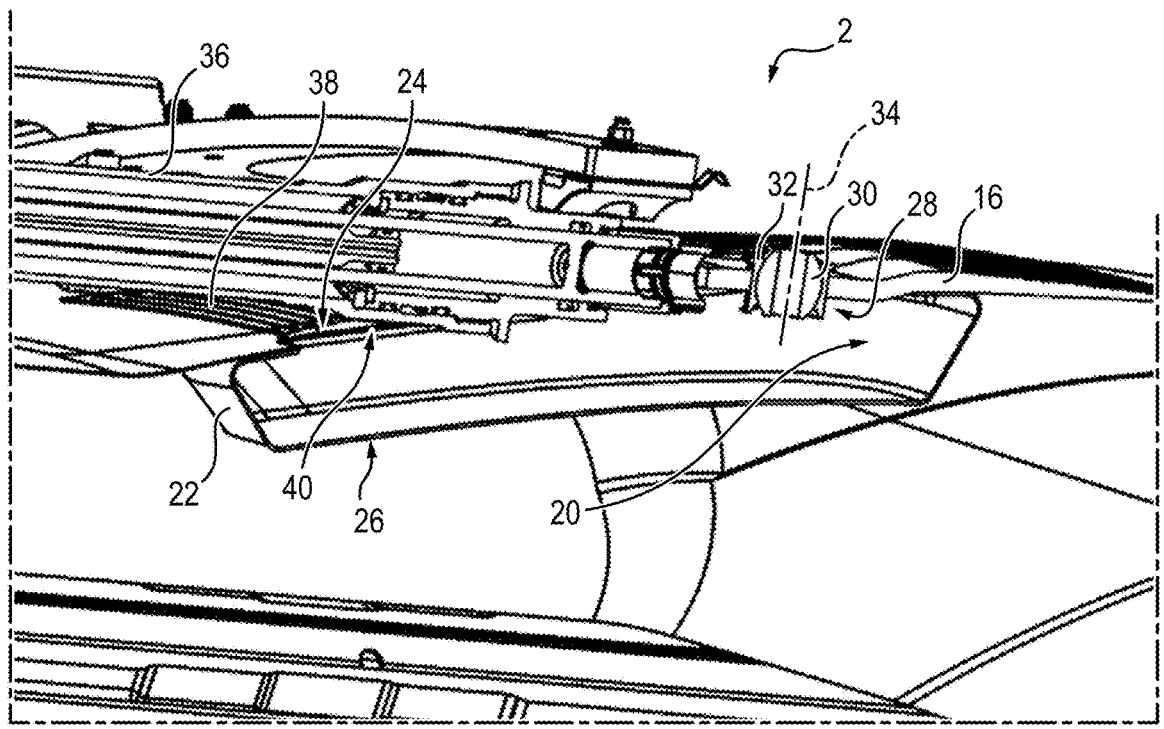

The assembly also comprises a member 28 forming a link comprising at least one degree of freedom, in this case a ball joint, attached in this embodiment solely to the outer skin 16 and extending facing the enclosure 20, as illustrated particularly in FIG. 3. This member here comprises a bush 30 having a spherical outer wall and a cylindrical inner wall giving a general olive shape.

The outer skin 16 comprises a cylindrical housing 32 having an axis 34 locally perpendicular to the plane of the faces of the outer skin 16. The housing passes through this skin along its thickness, the height of the housing 32 being greater than the thickness of the skin at this place. The bush 30 is contained in the housing 32 while being movable with respect to this housing. For this purpose, the housing 32 has a spherical inner face which interacts with the spherical outer face of the bush 30 by a surface-to-surface contact to form the ball joint.

Figure 2:
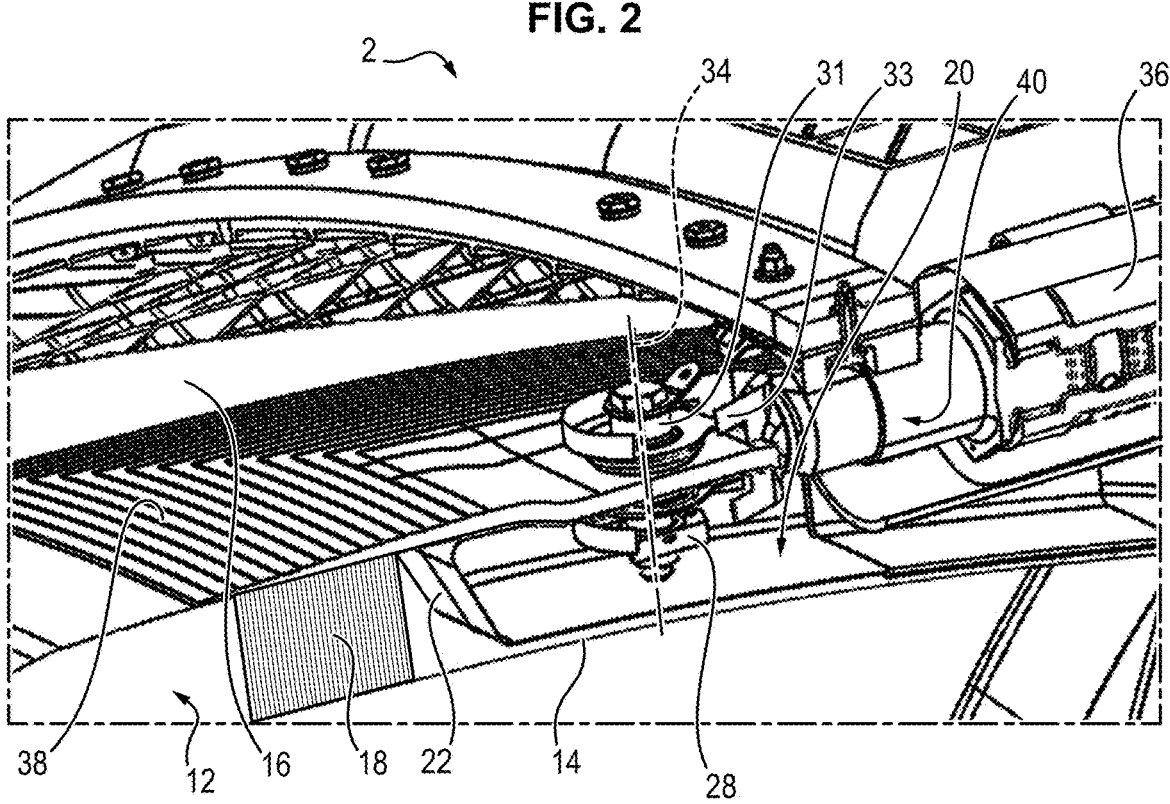
FIGS. 2 and 3 are perspective and section views of an assembly according to the invention equipping this engine.

As illustrated in FIG. 2, the member 28 also comprises in this example a pivot 31 contained in the bush 30 and a fork 33 attached to the axial ends of the pivot. The fork is also attached at one end of an operating actuator 36 of the thrust reverser. Thus the actuator is attached to the member 28.

Figure 4:
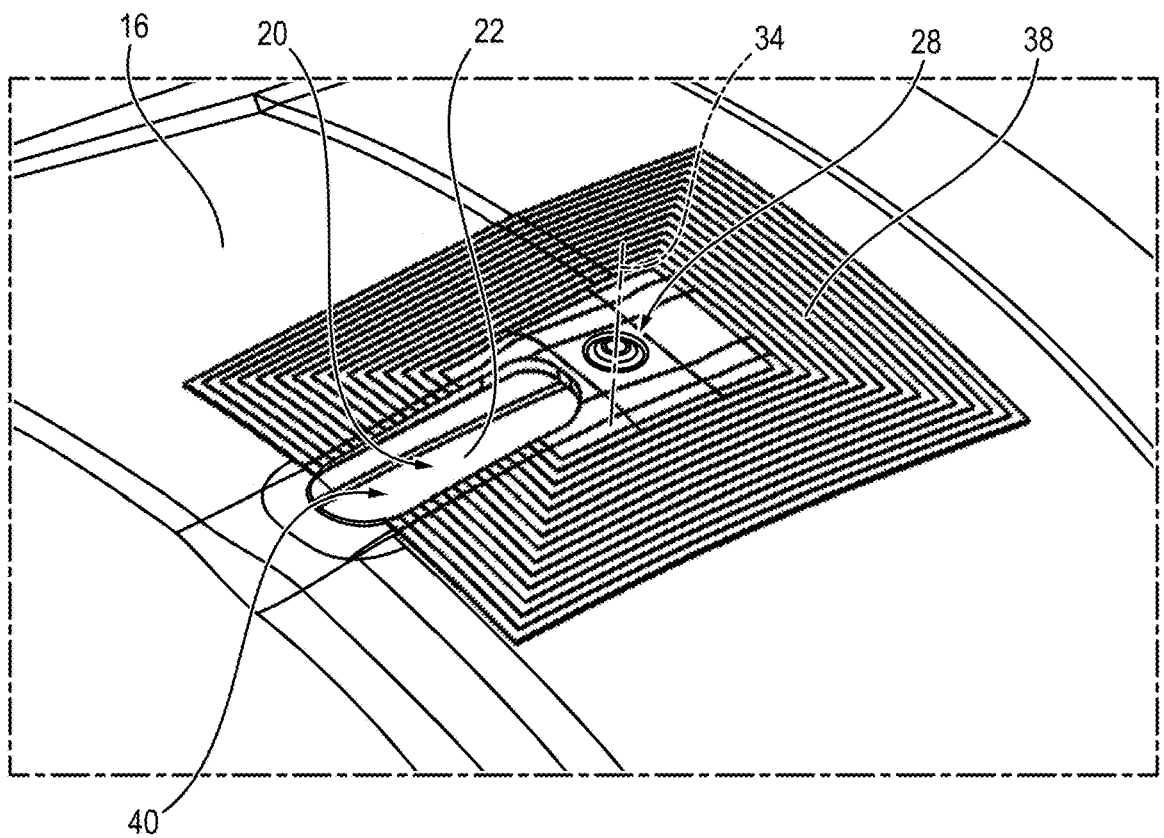
FIG. 4 is a view of the outer skin of the assembly of FIG. 2.

As illustrated in FIGS. 2 and 4, the outer skin 16 comprises a local reinforcement 38 extending solely over an area of the outer skin contiguous with the member 28 and having a surface area smaller than that of the outer skin. The reinforcement 38 is produced at the same time as the sandwich structure by the placing of layers or plies of pre-impregnated synthetic material. This reinforcement 38 is here formed out of composite material and comprises additional layers of composite material. Each layer has one and the same shape, for example a rectangular shape. Moreover, the layers are concentric, centered on the axis 34. The surface area of the layers decreases with each layer.

In a variant, this could be a reinforcement made of prebaked composite material and added on to the skin once the sandwich structure has been produced. In another variant, the reinforcement is made of metal and attached to the panel by blind or through rivets or bolts.

Particularly with reference to FIG. 4, the outer skin 16 has a through opening 40 which opens into the enclosure 20 and extends entirely at a distance from the member 28. Here the opening has an elongated oblong shape but other shapes are possible. It puts the enclosure 20 in communication with the outside of the panel 12. The bush 30, the pivot 31, the fork 33 and the actuator 36 extend partly in the enclosure 20.

The method for manufacturing the assembly comprises the following steps in this embodiment.

To produce the panel 12, a stack is made of the inner skin 14, the outer skin 16 and the honeycomb central layer 18 interposed between the outer and inner skins. For example, a stack is made of pre-impregnated composite material layers intended to form the skins, with interposition of the honeycomb layer. This is the lay-up.

In order to obtain the inner enclosure 20, the box 22 is also installed in the central layer 18. The box has in this case been made beforehand by additive manufacturing. It is for example self-stiffened. The box is installed in a hollow made beforehand in the central layer.

In order to make the reinforcement 38, layers of pre-impregnated composite material having a surface area which is reduced in relation to a surface area of the main composite material layers forming the outer skin 16 are also placed.

Next the stack is heated for the baking of the panel which produces the curing of the material of the skins. The stack is pressed during this step.

Next, the opening 40 forming an aperture opening into the enclosure 20 is made in the outer skin 16. This routing operation can be done by machining.

Then the bush 30 is attached exclusively to the outer skin 16, in the housing 32. Next the pivot 31, the form 33 and the actuator 36 are installed.

In a variant, the box 22 can be produced in situ. To do this, when the stack is produced, layers of pre-impregnated composite material configured to form the outer skin 16 are put in place around a core previously covered with a mold release agent. The latter can be a dry lubricant comprising polytetrafluoroethylene. The core can be made of foam, resin or a thermoplastic material. This can be a water-soluble core or else an element which can be inflated with air. The core has a male shape complementing the female shape of the enclosure 20 which it is to form. The lay-up takes place around the core.

After the baking and the making of the opening 40, the core is removed from the panel through the opening, this removal being facilitated by the mold release agent.

In another variant compatible with the previous one, the reinforcement 34 is formed by an element added onto the panel after baking of the panel, particularly by a mechanical means or by bonding.

The invention ensures the attachment of the actuator 36 by means of a small space between the outer panel of the nacelle and the acoustic inner panel of the translating cowl. The attachment occurs without passing through the whole thickness of the panel 12. It requires neither fittings nor high-density honeycomb element. It makes it possible to reduce the weight of the thrust reverser. Specifically, if the weight of the reinforcement layers is evaluated at 200 g, this weight remains well below the weight of 600 g, of a fitting, the presence of which is no longer needed.

Other embodiments of the invention will now be described. Most of the features common to the first embodiment will not be described again.

In the embodiment of FIG. 5, the panel 12 comprising the outer skin 16, the inner skin 14 and the central layer 18 appears again, the panel having the free inner enclosure 20. Once again, the member 28 is attached to the panel solely by the outer skin 16 but this time an intermediate support 35 links the member to the outer skin. The support is rigidly attached to the skin which is for example reinforced as in the first embodiment. The member 28 is connected to the support by at least one degree of mobility. It is thus again solely the outer skin which serves to link the member to the panel but this link is indirect. The support 35 is linked to a portion of the skin which extends facing the enclosure 20.

In the embodiment of FIG. 6, the same applies except that the support 35 is linked to a portion of the outer skin 12 which extends facing the central layer 18.

Figure 7:
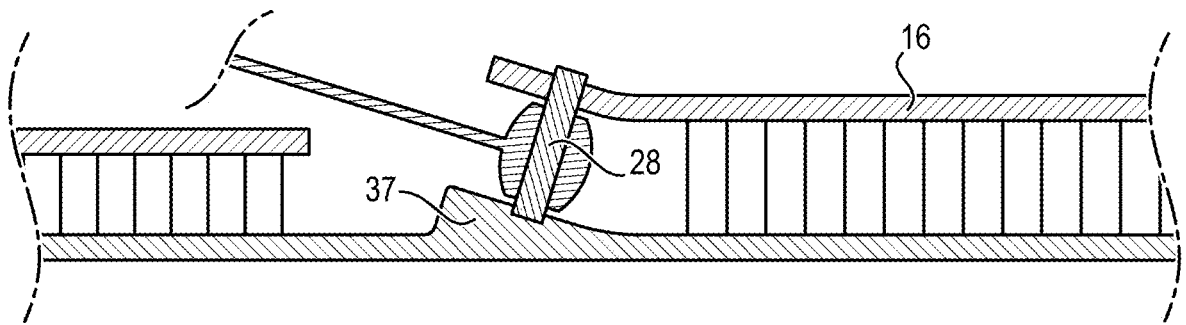

In the embodiment of FIG. 7, the member 28 is attached to the panel 12 by the outer 16 and inner 14 skins. Here it is directly attached to the outer skin on the one hand and to the inner skin on the other hand. It extends therebetween, in the enclosure 20. It is attached to portions of the outer and inner skins contiguous with the enclosure. Each of these skins can have a reinforcement for this purpose. The inner skin 14 thus has an overthickness or protuberance 37 extending in the enclosure.

Figure 8:
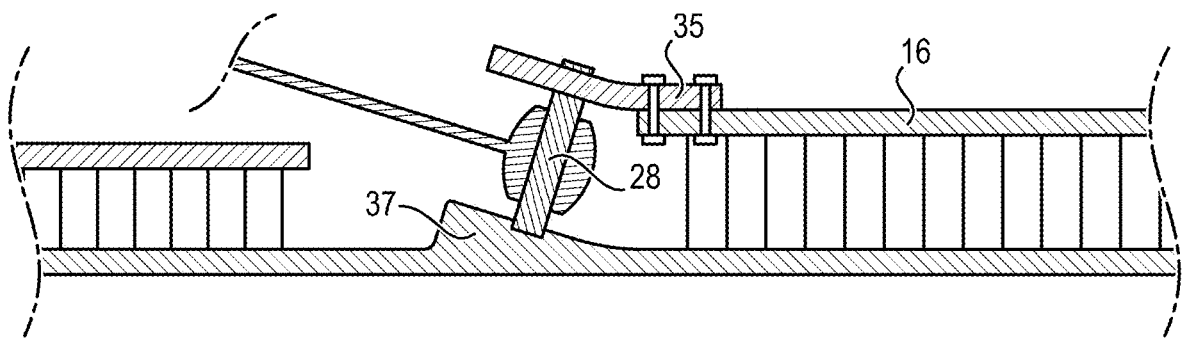

The embodiment of FIG. 8 combines the embodiments of FIGS. 5 to 7. Thus, the member 28 is attached to each of the outer 16 and inner 14 skins but the link to the outer skin 16 is done by means of an intermediate support 35 attached to a skin portion located facing the enclosure 20 and/or to a skin portion located facing the central layer 18.

Figure 9:
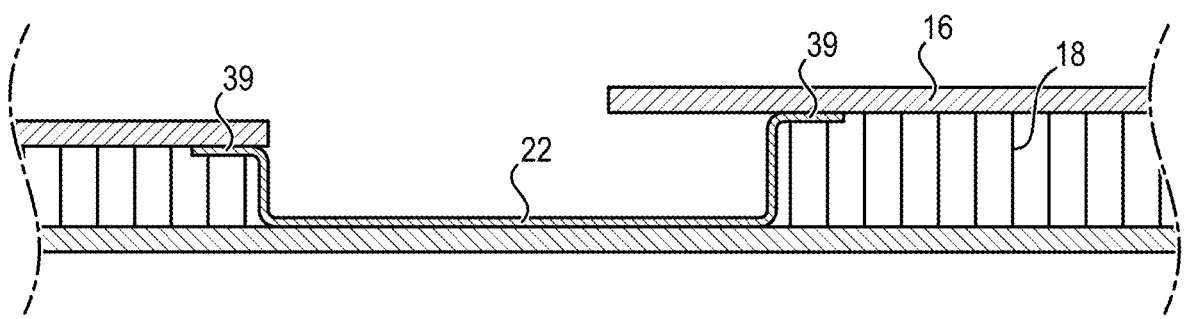
Figure 10:
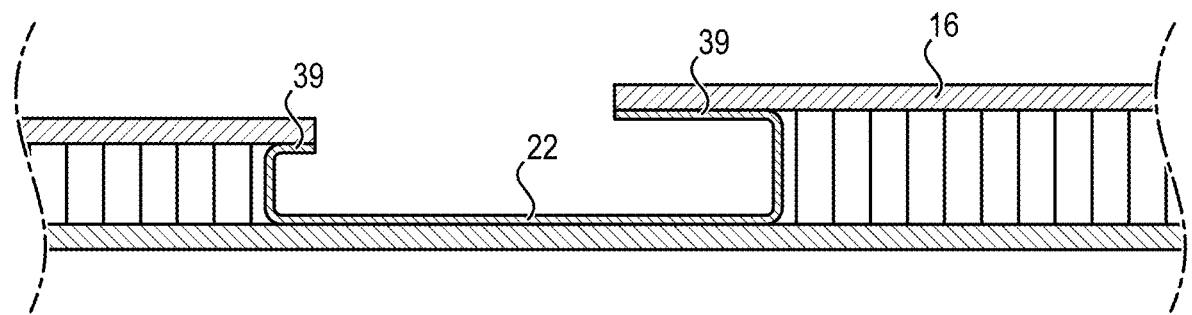
Figure 11:
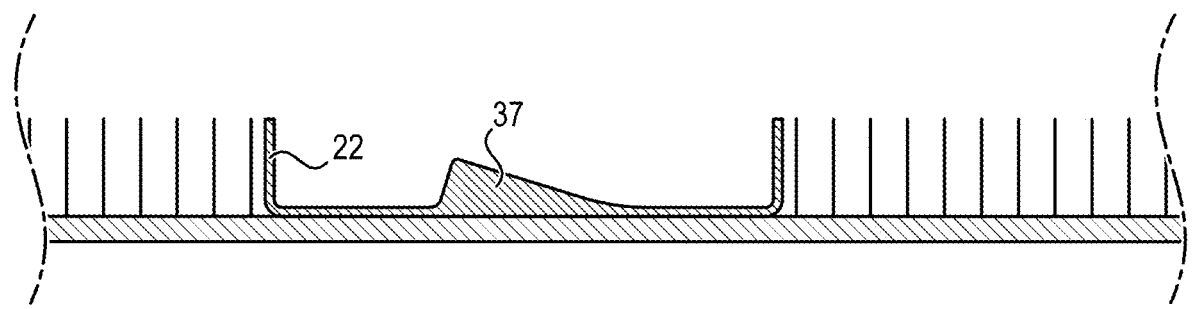

FIGS. 9 to 11 show embodiments of the box 22 surrounding the enclosure 20. They show boxes 22 reinforcing the hollow 20 of the central layer 18. In FIG. 9, the box has one or more peripheral rims 39 surrounding the mouth of the box and extending outward, in the opposite direction to the box. The or each rim 39 extends between the central layer 18 and the outer skin 16 while being sandwiched therebetween. In the embodiment of FIG. 10, the rims 39 extend toward the inside of the box. They are applied against portions of the outer skin 16 extending facing the enclosure 20. In the embodiment of FIG. 11, it is the bottom off the box 22 which has the protuberance 37 serving as a part of the attachment of the member 28 to the panel as in the embodiment of FIG. 7. The features of these figures can be combined with any of the other embodiments.

The reinforcement can be formed both by additional layers of material and by an add-on part.

Many modifications may be made to the invention without departing from the scope thereof.

The invention claimed is:

1. An assembly comprising:
   a nacelle panel comprising an outer skin, an inner skin and a central layer interposed between the outer skin and the inner skin, and the nacelle panel having a free inner enclosure contiguous with the outer skin; and
   a member forming a link comprising at least one degree of freedom, the member being attached to the nacelle panel solely by at least one of the outer skin and the inner skin, and the member extending facing the free inner enclosure,
   wherein the member is attached to the nacelle panel solely by the outer skin.

2. The assembly as claimed in claim 1, wherein the nacelle panel comprises a box defining the free inner enclosure.

3. The assembly as claimed in claim 1, wherein at least one of the outer skin and the inner skin comprises a reinforcement layer contiguous with the member, the reinforcement layer having a surface area smaller than a surface area of the at least one of the outer skin and the inner skin.

4. The assembly as claimed in claim 3, wherein the reinforcement layer is made of metal or of composite material.

5. The assembly as claimed in claim 1, comprising an operating actuator attached to the member.

6. The assembly as claimed in claim 5, wherein the operating actuator is an operating actuator of a thrust reverser.

7. The assembly as claimed in claim 1, wherein the outer skin has an opening which opens into the free inner enclosure and extends entirely at a distance from the member.

8. The assembly as claimed in claim 1, wherein the central layer is made of a honeycomb.

9. An aircraft engine comprising a thrust reverser and the assembly as claimed in claim 1.

10. The assembly as claimed in claim 1, wherein the outer skin has a through opening which opens into the free inner enclosure and extends at a distance from the member.

11. An assembly comprising:
    a nacelle panel comprising an outer skin, an inner skin and a central layer interposed between the outer skin and the inner skin, and the nacelle panel having a free inner enclosure contiguous with the outer skin; and a member forming a link comprising at least one degree of freedom, the member being attached to the nacelle panel solely by at least one of the outer skin and the inner skin, and the member extending facing the free inner enclosure, wherein the member comprises a fork and a pivot.

12. The assembly as claimed in claim 11, wherein the nacelle panel comprises a box defining the free inner enclosure.

13. The assembly as claimed in claim 11, wherein at least one of the outer skin and the inner skin comprises a reinforcement layer contiguous with the member, the reinforcement layer having a surface area smaller than a surface area of the at least one of the outer skin and the inner skin.

14. The assembly as claimed in claim 13, wherein the reinforcement layer is made of metal or of composite material.

15. The assembly as claimed in claim 11, wherein the member is attached to the nacelle panel solely by the outer skin.

16. The assembly as claimed in claim 11, wherein the member is attached to the nacelle panel by the outer skin and the inner skin.

17. The assembly as claimed in claim 11, comprising an intermediate support linking the member to one of the outer skin and the inner skin.

18. The assembly as claimed in claim 11, comprising an operating actuator attached to the member.

19. The assembly as claimed in claim 18, wherein the operating actuator is an operating actuator of a thrust reverse.

20. The assembly as claimed in claim 11, wherein the outer skin has an opening which opens into the free inner enclosure and extends entirely at a distance from the member.

21. The assembly as claimed in claim 11, wherein the central layer is made of a honeycomb.

22. The assembly as claimed in claim 11, wherein the link is a ball joint.

23. An aircraft engine comprising a thrust reverser and the assembly as claimed in claim 11.

24. The assembly as claimed in claim 11, wherein the outer skin has a through opening which opens into the free inner enclosure and extends at a distance from the member.

* * * * *